No. 633,335. Patented Sept. 19, 1899.
J. W. CAMERON.
REVOLVING FRUIT EVAPORATOR.
(Application filed Oct. 27, 1898.)
(No Model.) 2 Sheets—Sheet 1.
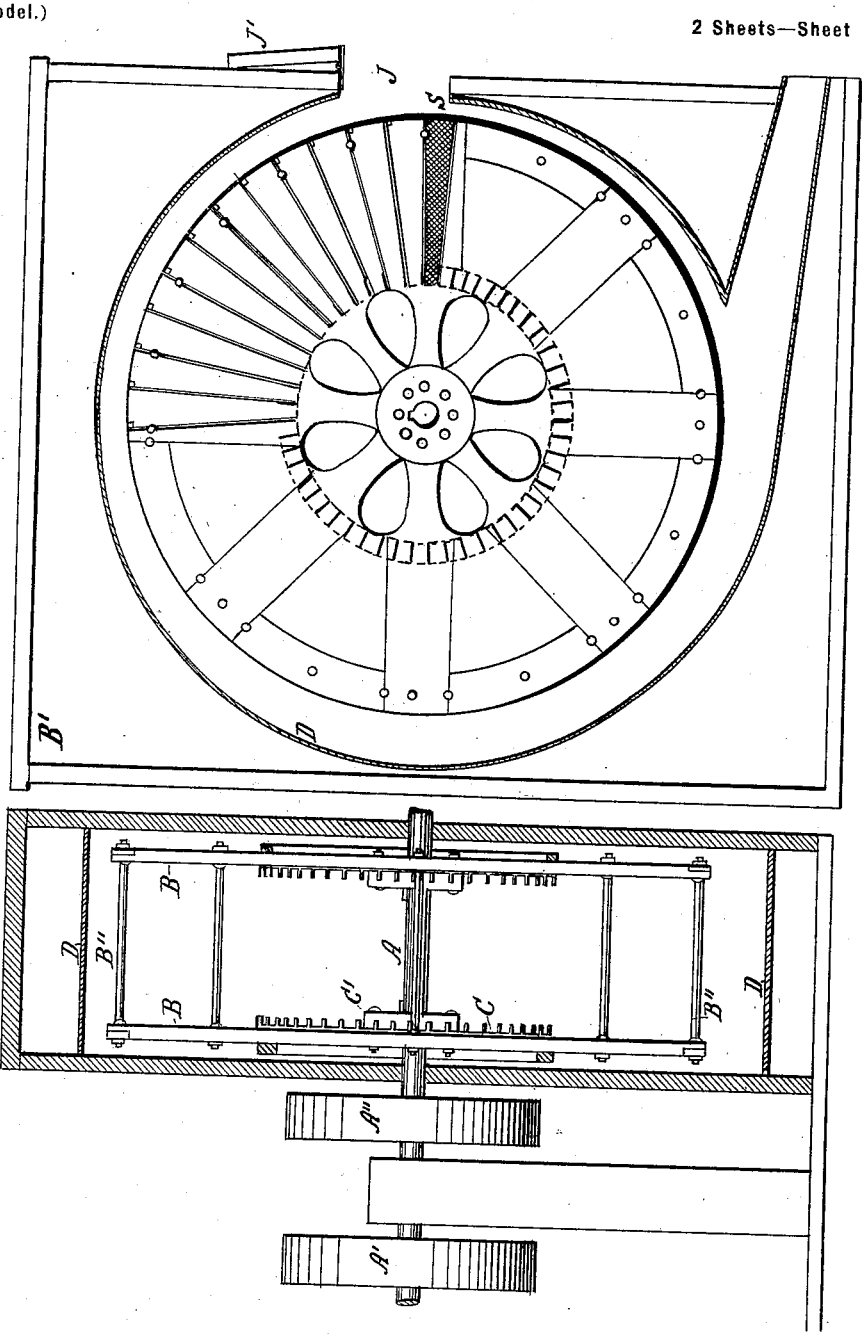
WITNESSES
INVENTOR
James W. Cameron
by Francis C. Bowen
ATTORNEY No. 633,335. Patented Sept. 19, 1899.
J. W. CAMERON.
REVOLVING FRUIT EVAPORATOR.
(Application filed Oct. 27, 1898.)
(No Model.) 2 Sheets—Sheet 2.
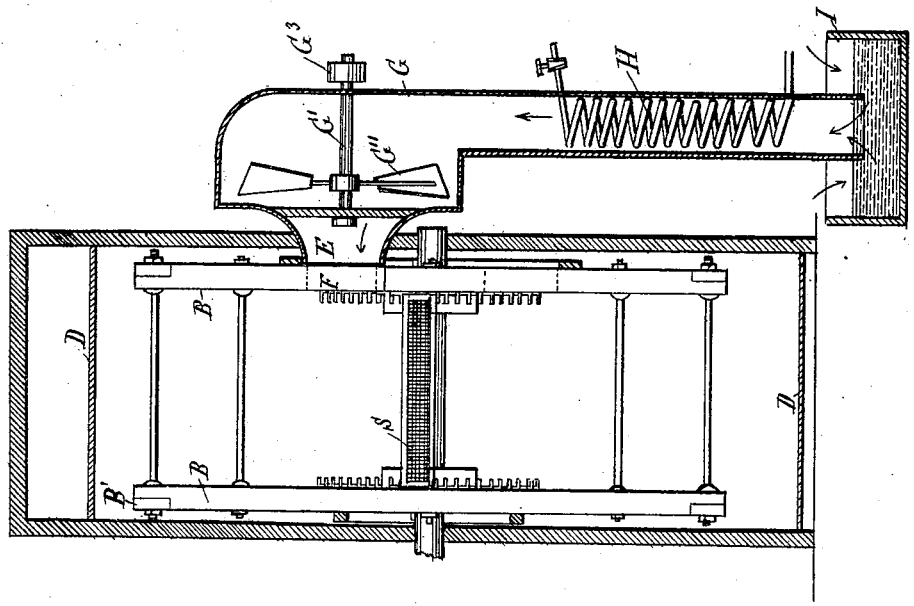
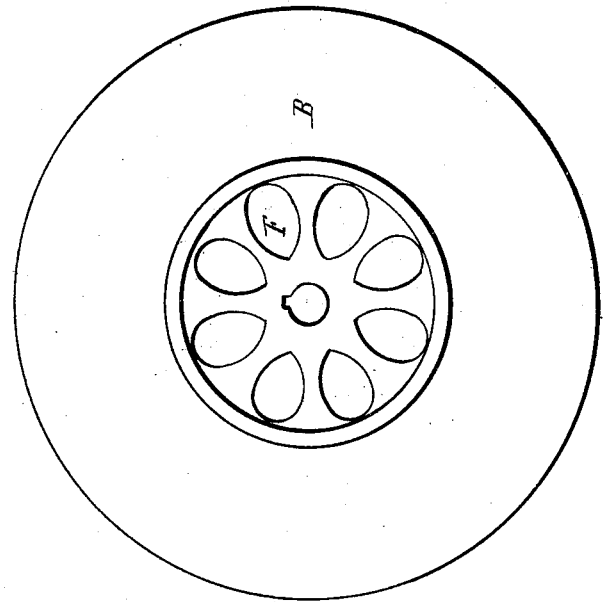
WITNESSES
INVENTOR
James W. Cameron
BY
Francis C. Bowen
ATTORNEY

United States Patent Office.

JAMES W. CAMERON, OF NEW YORK, N. Y., ASSIGNOR TO THE FRUIT, FLOWERS AND VEGETABLE EVAPORATING COMPANY, OF NEW JERSEY.

REVOLVING FRUIT-EVAPORATOR.

SPECIFICATION forming part of Letters Patent No. 633,335, dated September 19, 1899.

Application filed October 27, 1898. Serial No. 694,663. (No model.)

*To all whom it may concern:*

Be it known that I, JAMES W. CAMERON, a citizen of the United States, and a resident of New York, in the county of New York and State of New York, have invented certain new and useful Improvements in Revolving Fruit-Evaporators, of which the following is a specification.

My invention consists of a rotary drier or evaporator in which is incorporated a wheel with a series of radial receptacles for trays for containing the substance to be treated, in conjunction with a blower, which is arranged laterally to the drying-wheel and the purpose of which is to force air thereinto, and an attemperator for regulating the degree of temperature of air supplied to the wheel.

In the accompanying drawings, Figure 1 represents a partial side view and section of the apparatus with a portion of the tray-receptacle exposed. Fig. 2 represents a partial section and partial side view, looking at right angles to Fig. 1. Fig. 3 represents a vertical section thereof corresponding to Fig. 2 and including the blower and the attemperator. Fig. 4 represents a side view of the drying-wheel detached.

Similar letters of reference indicate similar parts.

The letter A indicates the shaft, on which is mounted the drying-wheel, which is composed, essentially, of two side heads B B and a surrounding drum-head B', constituting a part of the wheel-casing, the side heads B B being united by bracing-rods, as at B''. Each of the side heads, furthermore, is provided on the interior portion thereof with grooved disk C and a clamping-ring C', which form receptacles for the trays or pans in which in practice are placed fruits, flowers, or vegetables to be treated, the grooves of said disks and clamping-rings being radial to the axis of the drying-wheel. One of the pans is shown in end view at s, Figs. 3 and 1.

Surrounding the drying-wheel is a casing D, which in this example is eccentric thereto, and extending through one side of this casing is the mouth E of the blower, which mouth is opposite to a circular range or series of openings F on one side of the drying-wheel, which in the motion of the wheel are successively brought into communication with said mouth of the blower.

The blower is composed, essentially, of a casing G, a shaft G', concentric to the mouth or outlet of the blower, and a fan G'', mounted on said shaft to operate in a well-known manner. The blower-casing G also incloses in its lower part a coil-pipe H, which constitutes the attemperator and may supply heat or cold, as may be expedient, to the air supplied to the apparatus by means of the blower, and the lower end of casing is immersed in a liquid-bath, as of water, contained in the tank I.

Access is had to the drying-wheel for the purpose of introducing and removing the fruit-containing trays through an opening J next to the circumference of the wheel and which is provided with a door J', as is more clearly shown in Fig. 1, and for the purpose of imparting motion to the drier-wheel shaft A has pulleys A' A², while for the purpose of imparting motion to the blower-shaft it has a pulley G³, these pulleys being in practice connected with a proper source power.

The operation of the apparatus is as follows: The pans filled with the substance which it is desired to treat are introduced successively through inlet-opening J of the frame into the proper receptacle of the drying-wheel, and if desirable the pans may be held in position upon the wheel by means of a chain or the like wound thereon, or the wheel may be provided with a mechanical means, such as a catch, integral therewith for that purpose. A rotary motion is now imparted to the drying-wheel and to the blower-fan, with the effect of presenting the fans successively to the action of the blower through the opening F, whereby the moisture is rapidly and effectually eliminated from the fruit or other substance contained in the pans, the products of condensation of the moisture being received in the wheel-surrounding casing and thence escaping through the outlet D' in the lower part thereof.

What I claim as new, and desire to secure by Letters Patent, is—

1. In an evaporating apparatus the combination of the rotary wheel having a series of radial receptacles adapted to receive pans for containing the substances to be treated, a wheel-surrounding casing eccentric to the axis of the wheel and provided with an opening for the introduction and removal of the pans to and from said receptacle of the wheel, a spout leading from the lower part of said casing and a means for imparting motion to the wheel-shaft and wheel, substantially as and for the purpose herein described.

2. In an evaporating apparatus the combination of rotary wheels composed of circular heads mounted on suitable shaft and head connecting-rods, one of said heads being perforated with a circular range of openings forming air-passages, pan-receptacles on the inner facing of the heads, a surrounding casing eccentric to the axis of the wheel, provided with openings for the introduction and removal of the pans to and from said receptacle and from the wheel, a spout leading from the lower part of the casing, a blower connected to the casing at a point opposite the circular range of the openings of the perforated wheel-head and an attemperator connected with the blower, all substantially as and for the purpose herein described.

JAMES W. CAMERON.

Witnesses:
FRANCIS C. BOWEN,
JAS. S. EWBANK.